United States Patent [19]

Tsuboi

[11] 4,410,253
[45] Oct. 18, 1983

[54] CAMERA HAVING LENS PROTECTION COVER

[75] Inventor: Takayuki Tsuboi, Kawasaki, Japan

[73] Assignee: Canon Kabushiki Kaisha, Tokyo, Japan

[21] Appl. No.: 381,001

[22] Filed: May 21, 1982

[30] Foreign Application Priority Data

May 28, 1981 [JP] Japan .................................. 56-81697
May 28, 1981 [JP] Japan .................................. 56-81698

[51] Int. Cl.³ .......................... G03B 3/10; G03B 17/00
[52] U.S. Cl. ...................................... 354/195; 354/202
[58] Field of Search ................. 354/25, 187, 195, 173, 354/202, 288

[56] References Cited
U.S. PATENT DOCUMENTS 4,275,954  6/1981  Dobashi ......................... 354/25 N X
4,283,132  8/1981  Engelsmann et al. .............. 354/202
4,380,381  4/1983  Tezuka ................................ 354/173

Primary Examiner—John Gonzales
Attorney, Agent, or Firm—Toren, McGeady and Stanger

[57] ABSTRACT

Provided in the interior of a camera are an automatic focus adjusting mechanism which initiates a rearward motion from a position for focusing on an object at short distances to a position for focusing on an infinitely distant object when a distance adjusting member is released from the latching connection in the charged position against a bias force in response to actuation of a camera release, a protection cover arranged to shutter the front of a photographic objective lens when not in use, and an electric motor for charging the distance adjusting member. When a control knob for the protection cover is actuated, as the energized motor charges the distance adjusting member, the protection cover is caused to open. When the control knob is de-actuated, the protection cover is closed by the action of the bias force, while simultaneously the distance adjusting member is released from the arrested connection so that the objective lens is retracted to a position equivalent to focusing on an infinitely distant object.

19 Claims, 7 Drawing Figures

CAMERA HAVING LENS PROTECTION COVER

BACKGROUND OF THE INVENTION

1. Field of the Invention

This invention relates to cameras having protection covers to shutter the front of photographic objective lenses when not in use, and more particularly to cameras having protection covers with electric motors for charging the various protections of the camera whereby the opening and closing operation of said protection cover is performed by utilizing the driving force of the motor.

2. Description of the Prior Art

The conventional cameras have generally been provided with protection caps for the objective lenses in the releasably attached form to the camera housings in order to insure that when the camera is not in use, that is, when not in shooting, as the front or exposed-to-air lens surface of the photographic objective would otherwise attract dust, or be stained with dirt or fingerprints, the early grade of lens performance is still preserved, and that in such cases the photographic objective is protected from damages by direct contact with hard things. However, such protection caps have to be removed away from the camera housings when to shoot. Therefore, the photographers were hampered from the good management of their own cameras, and also liable to miss the isolated caps. In addition to such objections, there was a certain possibility of overlooking the removal of the protection cap from the front of the objective lens before a shot was made. Thus, the prior art protection means of such cap form gives to the cameras the drawbacks that the film is wastefully used up, or a good shutter chance is missed.

Attempts have been made in recent years to eliminate the above-described drawbacks by building the protection cover for the objective lens into the camera housing. The conventional arrangement of the protection cover has the following drawbacks:

That is, since the protection cover has despite the photographic objective even in the forwardly advanced position to move to the closing position in front of the photographic objective, the dimension of the conventional protection cover-built-in camera in the axial direction of the photographic objective becomes considerably larger than that of the protection cap-equipped camera. This is incompatible with the aim at an advance in the compactness of the camera. Further since the protection cover is arranged to be directly accessible by the operator, he must concentrate his deliberate effort on the control of the opening and closing operation of the protection cover, thus suffering the bad management.

It is also known to provide another type of protection cover-built-in camera in which when the protection cover is moving to the closing position, the objective lens is caused to move rearwards until the position for focusing on an infinitely distant object (focusing-at-infinity position) with an advantage that the axial dimension or width of the camera housing is minimized, as disclosed in U.S. Pat. No. 4,171,894 (filed Oct. 23, 1979). Since, however, this camera necessitates the direct handling of the protection cover by the operator and makes use of a drive connection between the mechanisms for closing the protection cover and for retracting the photographic objective, it follows that when to close the protection cover, the operator is obliged to apply to the protection cover the sum of a force necessary to move the protection cover to the closing position and a force necessary to move the photographic objective to the retracted position. For this reason, as a heavier stress than the normal level is felt, there is produced a problem that the manageability is deteriorated remarkably badly.

In short, the prior art protection cover-built-in cameras have either the drawback that the large increase in the width of the camera housing is unavoidable and the drawback that the quick and easy handling is very difficult in combination, or the drawback that the reduction of the width of the camera housing leads to further intensify the difficult handling, thus being a great annoyance to the ordinary photographers in practice.

SUMMARY OF THE INVENTION

With the foregoing in mind, it is an object of the present invention to provide a camera having a lens protection cover operable to open and close without the necessity of an unduly large activating force.

Another object of the invention is to provide a camera having a lens protection cover of which the opening and closing operation can be carried out by utilizing a motor which is adapted to charge the various mechanisms of the camera.

Still another object of the invention is to provide a camera having a lens protection cover cooperative with a photographic objective lens thereof in such a manner that when a closing operation of the protection cover is initiated, the photographic objective lens is automatically retracted without giving a stress to the protection cover.

These and other objects of the present invention will become apparent from the following detailed description of an embodiment thereof.

DETAILED DESCRIPTION OF THE PREFERRED EMBODIMENT

Figure 1:
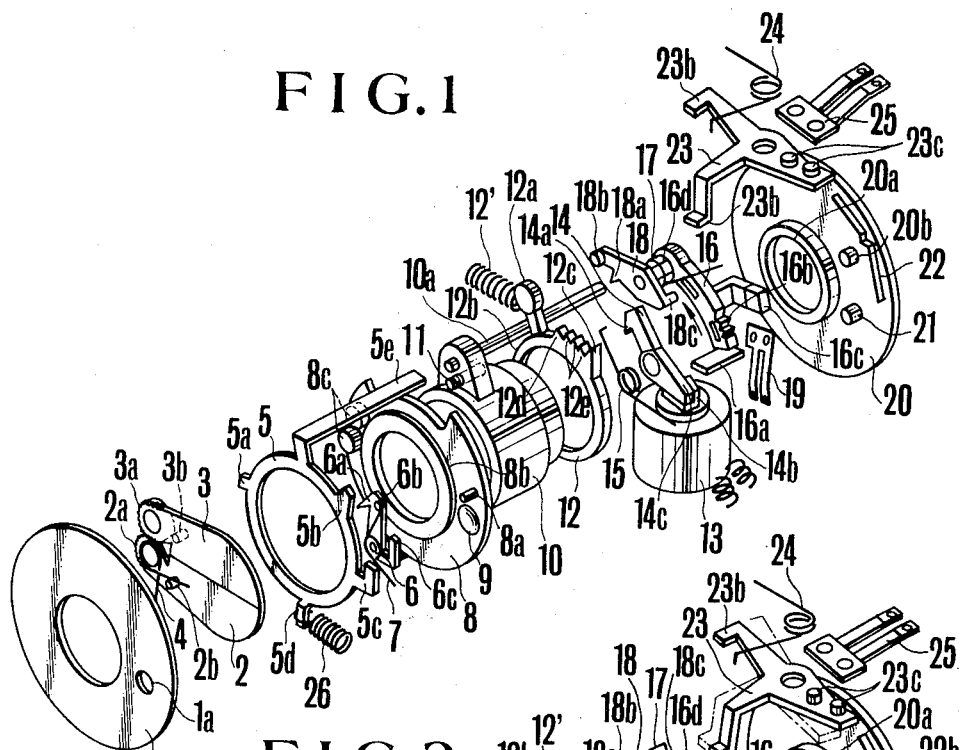
FIG. 1 is an exploded perspective view illustrating an embodiment of the present invention with a protection cover in a closing position.

In FIG. 1, a name disc plate 1 has a light metering window 1a. Lens protection cover blades 2 and 3 have geared portions 2a and 3a meshing with each other so as to turn in opposite directions to each other and are pivotally mounted at respective pins 8c on a front plate 8. A spring 4 urges the protection cover blade 2 in a clockwise direction as viewed in the drawing since a pin 2b on the blade 2 bears one arm of the spring 4, thereby the protection cover blades 2 and 3 are driven to open up. But, as a pin 3b on the protection cover blade 3 abuts on a radial extension 5a of a cover drive ring 5, the blades 2 and 3 are maintained in the closing position. The cover drive ring 5 is rotatably fitted on an annular portion 8b of the front plate 8 and has its center of rotation in coincidence with an optical axis of the objective lens (not shown). Since a stronger spring 26 than the spring 4 is connected to a second radial extension 5d and urges the cover drive spring 5 in a counterclockwise direction as viewed in the drawing, the protection cover blades 2 and 3 assume the position of FIG. 1.

Figure 2:
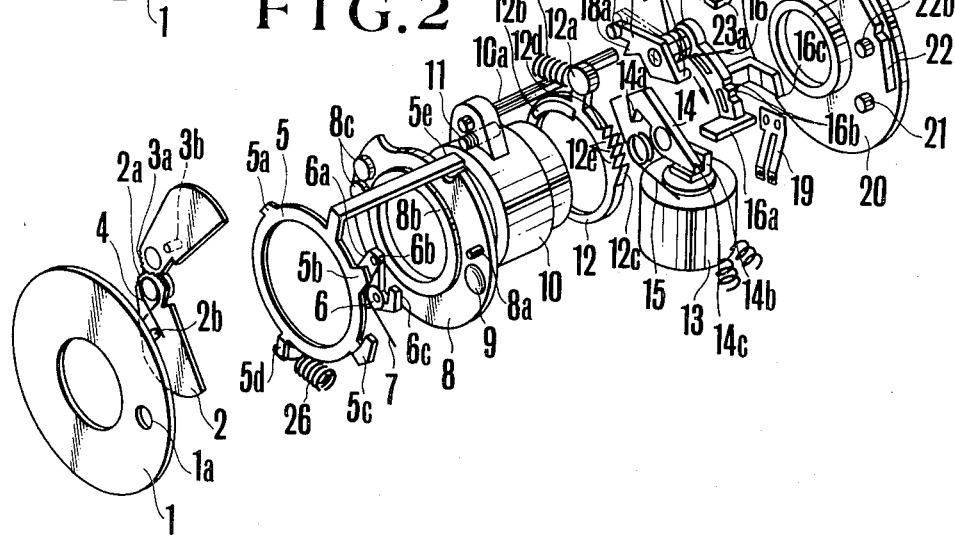
FIG. 2 is a similar view to FIG. 1 except that an opening position of the protection cover is shown.

The cover drive ring 5 is further provided with a lug 5b arranged to engage a pawl 6a of a latch lever 6 in the position of FIG. 2 where the protection cover blades 2 and 3 are fully opened, a shutter 5c arranged to close the light metering window 1a when in the position of FIG. 1, and a charge arm 5e extending into the path of movement of a radial extension 12a on a distance adjusting member 12 or engageable with said radial extension 12a. The latch lever 6 is pivotally mounted at a pin 8a on the front base plate 8 and urged by a spring 7 abuttingly engaging on a pin 6b provided in the pawl 6a in a counterclockwise direction as viewed in the drawing. In FIG. 1, however, a control knob 16 presses it at a tail 6c thereof by an extension 16a so that the latch lever 6 is held stationary in the illustrated position, where the aforesaid pawl 6a is taken out of the path of movement of the lug 5b of the cover drive ring 5.

Figure 7:
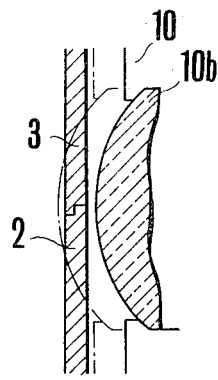
FIG. 7 is a fragmentary sectional view illustrating what places the protection cover and the objective lens take when moved to the closing and retracted positions respectively.

The front base plate 8 has, besides the aforesaid pin 8a, annular portion 8b and shafts 8c, a collection lens 9 formed as a unit therewith in axial alignment to the light metering window 1a. A lens holder 10 containing the objective (at 10b in FIG. 7) is movable only in the axial directions of the objective 10b to effect focusing as is guided by a shaft 10a, and is urged by a spring (not shown) to the right as viewed in the drawing (in the direction to move the objective 10b rearwards). A small screw 11 abuts at its one end on a camming surface 12b of the distance adjusting member 12 and is formed as a unit with the aforesaid lens holder 10 so that the bias force of the lens holder 10 presses the screw or cam follower 11 against the camming surface 12b.

The distance adjusting ring 12 for rotation about the axis of the photographic objective is borne on an annular portion 20a of a rear base plate 20 and is urged by a spring 12' in a counterclockwise direction as viewed in the drawing. In the position of FIG. 1, however, because its lug 12c is engaged by a pawl 14a of a latch lever 14, the ring 12 is set in the counterclockwise-most position.

Besides the aforesaid charge arm 12a, cam portion 12b and lug 12c, the distance adjusting member 12 has a charge lug 12d arranged to engage the pawl 14a of the latch lever 14 when the distance adjusting member 12 is charged as illustrated in FIG. 2 and when a magnet 13 is not magnetized. The magnet 13 is of the attraction type, operating in such a manner that responsive to a signal representing actuation of a camera release from a shutter button (not shown), it attracts an armature 14b on the latch lever 14 against a spring 15, and then responsive to a signal representing detection of an in-focus condition from an object distance measuring portion (not shown) it is de-energized, causing the latch lever pawl 14a to put in engagement with one of teeth 12e, thus the moving objective is arrested in the adjusted position of sharp focus.

An actuator 16 for controlling the opening and closing operation of the protection cover blades 2 and 3 is formed as a unit with the control knob 16c and is made movable in a circle with its center at the optical axis of the objective lens. The pressor 16a on one end of the actuator 16 acts on the 1st and 2nd latch levers 6 and 14 at their tails 6c and 14c and turns the levers 6 and 14 in a clockwise direction when the actuator 16 moves from the opening position of FIG. 2 to the closing position of FIG. 1, thereby the latch lever pawls 6a and 14a are disengaged from the lugs 5b and 12d of the cover drive ring 5 and the distance adjusting member 12. Further, formed in the upper surface of the one end portion of the actuator 16 are click grooves 16b cooperative with a click leaf spring 22 to give the operator a sense of when the control knob 16c is set on the opening or closing position and also to hold the actuator member 16 stationary in the selected position. On the opposite end of the actuator member 16 there is shown a pivot pin 16d fixed thereto on which is movably mounted a drive lever 18. The drive lever 18 is urged by a spring 17 in a counterclockwise direction as viewed in the drawing, but the range of rotation of the drive lever 18 is limited by a stopper 18c abutting on the lower surface of the actuator 16 when in the position of FIG. 1. An extension 18a is arranged so that as the actuator 16 moves from the position of FIG. 1 to a direction indicated by arrow, it is at a time during the motion that it contacts with an arm 23a of a switch lever 23 for controlling the operation of an electric motor, and then turns the lever 23 in a clockwise direction. The drive lever 18 is provided with a pin 18b extending into the path of movement of the charge arm 12a of the aforesaid distance adjusting member 12 so that at a time during the clockwise movement of the distance adjusting member 12 from the position of FIG. 1, the charge arm 12a acts on the pin 18b and then turns the drive lever 18 in a clockwise direction against the bias force of the spring 17, thereby the extension 18a is disengaged from the arm 23a of the aforesaid switch lever 23.

An electrical power switch contact 19 is formed as a unit with the actuator member 16 and slidingly moves between electrically conductive and non-conductive patches (not shown) for ON and OFF of current supply when said actuator 16 is operated. The rear base plate 20 has besides the aforesaid annular portion 20a and the shaft 20b, a light guide 21 formed as a unit therewith to pass a light beam emerging from the collection lens 9 therethrough to a photo-sensitive element (not shown) constituting part of a shutter control circuit (not shown), and a fixer (not shown) for the click leaf spring 22 at the ends thereof. The switch lever 23 has, besides the aforesaid arm 23a, a pawl 23b at one end thereof, and contact hold pins 23c at the opposite end thereof, and is pivotally mounted to a camera framework (not shown). A spring 24 urges the lever 23 in a counterclockwise direction as viewed in the drawing. A motor control switch contact 25 is fixedly carried on the switch lever 23 by the pins 23c and arranged to control current supply to the motor depending upon the angular position of the switch lever 23. Also, the switch lever 23 is responsive even to the completion of an exposure by the shutter to turn in a clockwise direction as is pushed by a member (not shown). Such clockwise movement causes the pawl 23b to move away from a recess 27a of a cam 27. The cam 27 is driven to rotate by the driving torque of the motor and is so adjusted that in one revolution terminating at an event that the pawl 23b of the switch lever 23 comes again to engage in the recess 27a, transportation of the film by one frame, charging of a shutter mechanism, and charging of an automatic focus adjusting mechanism (AF mechanism) are completed.

Figure 3:
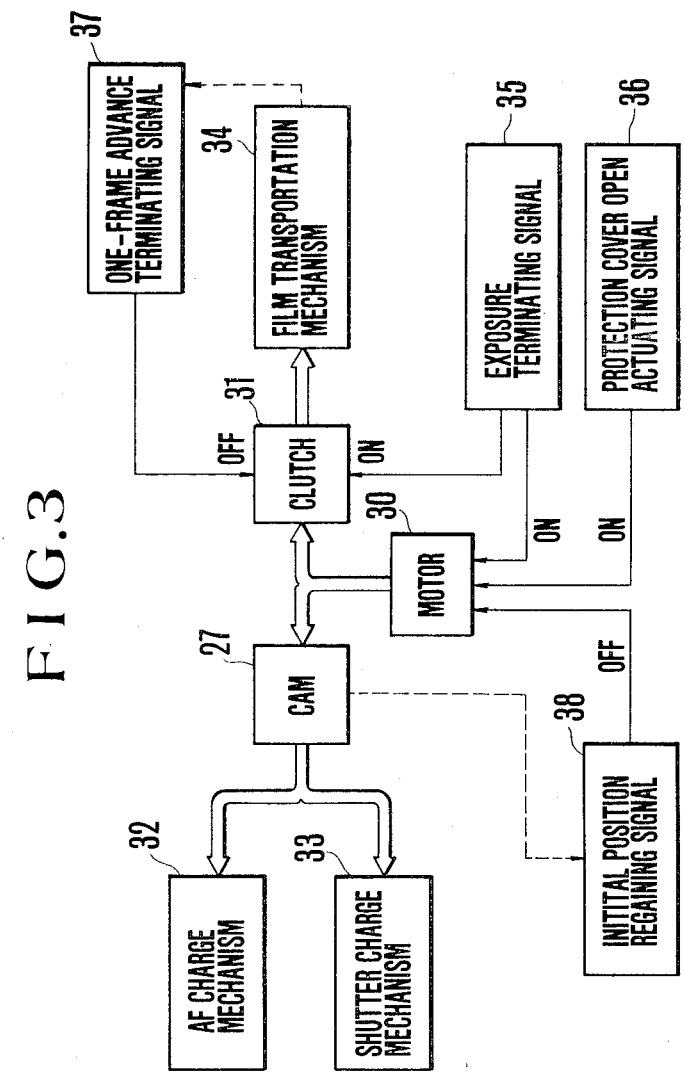
FIG. 3 is a block diagram illustrating flow of signals through the various portions of the camera of the invention.

Next, in FIG. 3, a block 27 represents the aforesaid cam drivenly connected to a motor 30 and transmitting the driving torque of the motor 30 to an AF charging mechanism 32 and a shutter charging mechanism 33. A block 31 is a clutch controlling transmission of the driving torque of the motor 30 to a film transportation mechanism 34, as it operates in such a manner that when the shutter runs down to terminate the exposure, the transmission is established by a signal 35, and when the film is advanced one frame by the action of the film transportation mechanism 34, the transmission is cut off by a signal 37. Therefore, the driving torque of the motor 30 is no longer transmitted to the film transportation mechanism from the time when the film has been wound up in the length of one frame.

The motor 30 is de-energized when a signal 38 representing that the cam 27 has rotated one revolution to return to the initial position after the one-frame advancement of the film, is produced, and the driving gets stopped. It is noted here that this signal 38 in view of the embodiment of FIG. 1 has the same information as when the pawl 23b of the switch lever 23 enters the recess 27a of the cam 27 again so that the switch contact 35 returns to the initial position.

Also the energization of the motor 30 can be otherwise made even by a signal 36 representing an actuation of the protection of the protection cover to open which is produced when the actuator 16 of FIG. 1 is moved to turn the switch lever 23, and a driving starts. At this time, however, the clutch 34 is left cut off. Therefore, the film transportation mechanism 34 is not activated, but the AF charge mechanism 32 and shutter charge mechanism 33 only are set to work through the cam 27.

It is to be noted that the construction and arrangement of the above-described parts except the protection cover and those constituting an operating mechanism therefor is shown in more detail in Japanese Patent Application Sho No. 55-156849 (corresponding to U.S. pat. application Ser. No. 318,584 filed Nov. 5, 1981, now U.S. Pat. No. 4,380,381) precedingly proposed by the applicant of the present patent application. Accordingly, no more detailed explanation is given here.

Next explanation is given to the operation of the camera employing such form of the invention.

The camera is first assumed to be in the position of FIG. 1 where the pawl 23b of the switch lever 23 engages in the recess 27a of the cam 27.

Then, to make the camera ready to shoot, the operator will turn the control knob 16c in the direction indicated by arrow in FIG. 1, for the protection cover blades 2 and 3 are to be opened. Since the control knob 16c is formed as a unit with the actuator member 16, the latter is caused to turn about the optical axis in the counterclockwise direction, until the next groove 16b is in registry with the lobe of the click leaf spring 22, thus being held in the advanced position.

Such actuation causes the contact 19 to move to ON position of the power switch and also causes the latch levers 6 and 14 to be freed from the pressure by the pressor 16a of the actuator member 16, thus permitting the latch lever 6 by the spring 7 and the latch lever 14 by the spring 15 each to turn in the counterclockwise direction to the position of FIG. 2. Therefore, the pawl 6a of the latch lever is rendered engageable with the lug 5b of the drive ring 5 and the pawl 14a of the latch lever 14 is rendered engageable with the lug 12d of the distance adjusting member 12.

Figure 5:
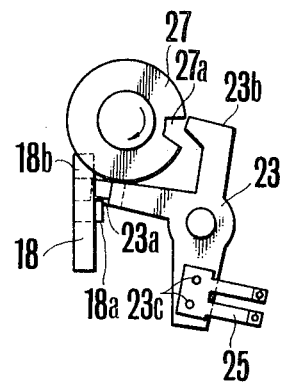
FIG. 5 is a similar view to FIG. 4 except that a second position of the invention is illustrated where the protection cover is actuated to open.

Further, on a midway through the movement of the actuator 16, the pawl 18a of the drive lever 18 pushes the arm 23a of the switch lever 23, thereby the switch lever 23 is turned in the clockwise direction against the bias force of the spring 24 to the position of FIG. 5. When the switch lever pawl 23a is disengaged from the recess 27a of the cam 27 and further the switch contact 25 changes its position from the motor shortening of a current supply control circuit to the energization of the motor 30, the motor 30 starts to move. Since, at this time, as has been mentioned above, the film transportation mechanism 34 is in the cut-off position by the clutch 31, motion of the motor 30 is then transmitted to the AF charge mechanism 32 and the shutter charge mechanism 33 alone.

The AF charge mechanism 32 responsive to the driving force of the motor 30 turns the distance adjusting member 12 in the clockwise direction against the bias force of the spring 12' to a charged position. At this time, the cover drive ring 5 is also charged by the arm 12a of the said member 12 abuttingly engaging the charge arm 5e, as is simultaneously turned in the clockwise direction against the bias force of the spring 26. Therefore, the protection cover 2, 3 starts to open up as the pin 3b follows up the extension 5a of the cover drive ring 5.

Figure 6:
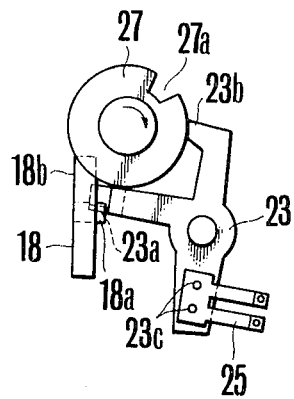
FIG. 6 is a similar view to FIG. 5 except that a third position of the invention is illustrated where the opening operation of the protection cover is about to terminate.

On the other hand, when the distance adjusting member 12 is charged in a mid-course, the charge arm 12a contacts with the pin 18b on the drive lever 18 and turns the latter in the clockwise direction against the bias force of the spring 12. Therefore, at this time, the pawl 18a of the drive lever 18 is disengaged from the switch lever arm 23a, for the switch lever 23 is turned in the counterclockwise direction by the spring 24. But since the cam recess 27b is not in alignment with the pawl 23b yet as illustrated in FIG. 6, or is riding on the outer periphery of the cam 27, the switch lever 23 is restrained from pivoting movement.

After that, when the distance adjusting member 12 reaches a prescribed charged position, the latch lever pawl 14a catches said member 12 at the tooth 12d and at the same time said cover drive ring 5 is also held by the latch lever pawl 6a engaging the lug 5b. As a result, the protection cover 2, 3 fully opens up, taking the position of FIG. 2.

Figure 4:
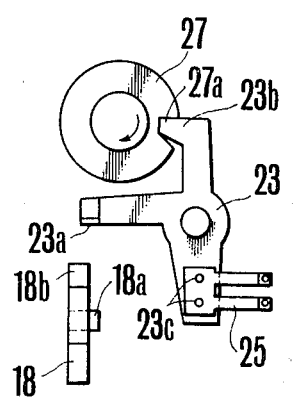
FIG. 4 is an elevational view of the motor control portion in the camera of the invention with the protection cover in the closing position.

Soon after this, the cam 27 completes one revolution, thereby the switch lever pawl 23b is engaged in the recess 27a again. Therefore, the switch contact 25 is returned by the switch lever 23 to the initial position of FIG. 4, and the duration of current supply to the motor 30 is terminated.

Such movement of the distance adjusting member 12 to the charged position also causes movement of the cam portion 12b on which the screwed cam follower 11 abuts, and therefore causes this cam 12b to move the lens holder 10 forwards along the guide shaft 10a. Thus, the photographic objective is set on the focusing-at-infinity position which is indicated by dot-and-dash lines in FIG. 7, and where its front vertex protrudes outside the camera housing beyond an imaginary plane which the closed protection cover 2, 3 occupies.

With the camera in the position of FIG. 2, when the photographer pushes down the shutter button (not shown) to effect actuation of a camera release, it is at first that the magnet 13 is magnetized, causing the latch lever 14 to turn in the clockwise direction until the pawl 14a disengages from the lug 12d of the distance adjusting member 12. Thereupon, the distance adjusting member 12 starts to rotate in the counterclockwise direction under the action of the spring 12', while moving the lens holder along the guide shaft 10a rearwardly or towards the film plane. Then, when the objective lens 10b is focused down to the given object distance sensed by a range finding device (not shown), the magnetic field by the magnet 13 disappears to allow the latch lever 14 to turn in the counterclockwise direction by the spring 15. Then, the pawl 14a engages with one of the teeth 12e of the distance adjusting member 12, thereby the lens holder gets stopped from further rearward movement. Thus automatic adjustment of the photographic objective lens 10b to the in-focus position is formed.

It is next to this that the shutter (not shown) is released, initiating an exposure. The period of actuation of the shutter is automatically controlled in accordance with the object brightness level and other preset exposure factors. At the termination of the period of actuation of the shutter, the clutch 31 of FIG. 3 is rendered operative, and the switch lever 23 is turned in the clockwise direction by a member (not shown) to supply current to the motor 30. By this, the film transportation mechanism 34 is driven to move the film. When the film is advanced through the length of one frame, the clutch 31 is cut off and the mechanism 34 stops its operation. Also the AF charge mechanism 32 and shutter charge mechanism 33 move and their chargings are completed before the cam 27 rotates one revolution to cut off the current supply to the motor 30. That is, at this time, the distance adjusting member 12 is charged so that the latch lever pawl 14a and the lug 2d are brought into engagement with each other again.

It should be pointed out that during this sequence of operations, the protection cover 2, 3 is maintained open since the cover drive ring 5 is retained by the latch lever pawl 6a engaging the lug 5b. It should be also pointed out that at this time the drive lever pawl 18a is retracted from the path of movement of the switch lever arm 23a, there is no possibility of occurrence of their engagement.

Discussion will next be conducted with how to close the protection cover 2, 3 after no more shots are intended. With the camera in the position of FIG. 2, as the photographer decides to close the protection cover 2, 3, when he turns the control knob 16c in the clockwise direction as viewed in the drawing, the power switch is cut off by the switch contact 19, and the pressor 16a of the actuator 16 pushes down the tail 14c of the latch lever 14 and the tail 6c of the latch lever 6 against the bias forces acting in the clockwise direction. Then, the distance adjusting member 12 and the cover drive ring 5 are released from the latching connection, each turning in the clockwise direction by the respective spring. Such rotative movement of the distance adjusting member 12 causes the photographic objective lens holder 10 to move along the guide shaft 10a rearwards or towards the film plane and finally reach a position illustrated by solid lines in FIG. 7. On the other hand, such rotative movement of the cover drive ring 5 causes disengagement of the extension 5a from the pin 3b, permitting the protection cover 2, 3 to move in a direction to close and finally reach the lens shuttering-off position of FIG. 1. Also, at this time, the light-shield 5c shutters off the collection lens 9 too.

Though the foregoing embodiment has been described in connection with the protection means of which the use is limited to only the photographic objective lens and the light metering window, this protection means may be modified so as to simultaneously shutter off the finder. Also though the actuator for the protection means is constructed in the mechanical form, it is also possible to construct it in an electrically operated form such that when a button is actuated, the latch levers are moved by electrically operated magnetic control devices, and the operating means for the power supply control device of the motor is electrically related thereto. Also, the illustrated actuator is of the slide type, but may be of another type, for example, push-button type.

Further, in the present embodiment, the charging member for the lens holder is drivingly connected to open the protection cover. This drive connection may be otherwise formed by using the charging member for the shutter.

As has been described in greater detail above, according to the present invention, the driving torque of the motor for charging the various portions of the camera can be utilized in controlling the opening and closing operation of the protection cover, thereby giving an advantage that there is no need of exerting an excessive effort to open and close the protection cover, and the manageability of such camera can be remarkably improved.

Another feature of the invention is that when the protection cover is opened, the photographic objective is automatically set on the frontmost or focusing start position, and when to close the protection cover, the photographic objective is also automatically retracted from any focusing station to the rearmost possible position, thereby it being made possible to achieve a minimization of the axial dimension of the protection cover-built-in camera housing. Thus, in the art of such cameras, an advance in the compactness is achieved.

Still another feature of the invention is that the actuator for the protection cover also serves to charge only the photographic objective. In application to, for example, auto-focus cameras having the pre-focus function, therefore, an advantage is produced that focusing can be readjusted a desired number of times, thus providing assurance that the imaging performance of such auto-focus camera remains excellent at increased photographic situations.

A further feature of the invention is the coordination control of the protection cover in such a way that after the termination of the opening operation of the protection cover is detected, the current supply to the motor is made stopped. Thus, the opening operation of the protection cover can be controlled with high accuracy and reliability.

What is claimed is:
1. A camera having a photographic objective lens and a protection cover capable of shuttering off the front of at least said photographic objective lens, comprising:
  (a) actuating means for controlling the opening and closing operation of said protection cover;
  (b) electric motor means arranged upon movement of said actuating means in a first direction to be energized for a predetermined time;

(c) driving means for opening and closing said protection cover, said driving means operating as the driving torque of said electric motor means is transmitted thereto; and
(d) latching means arranged to latch said driving means when motion of said driving means by said electric motor means reaches a terminal end, said latching means being responsive to movement of said actuating means in a second direction releasing said latching connection.

2. A camera according to claim 1, further comprising:
(e) bias means urging said driving means in an opposite direction to that in which said driving means is moved by said electric motor means.

3. A camera according to claim 2, wherein said driving means is supported rotatably about an axis of said photographic objective lens.

4. A camera having a photographic objective lens and a protection cover capable of shuttering off the front of at least said photographic objective lens, comprising:
(a) electric motor means;
(b) means for opening and closing said protection cover, said driving means operating as the driving torque of said electric motor means is transmitted thereto;
(c) latching means arranged to latch said driving means when motion of said driving means reaches a terminal end; and
(d) timer means controlling the period of current supply to said electric motor means, said timer means stopping current supply to said electric motor after latching of said driving means by said latching means is completed.

5. A camera according to claim 4, wherein said timer means is actuated by said electric motor means.

6. A camera according to claim 5, wherein said timer means has a cam connected to be driven by said electric motor means, and an actuating lever contacting with said cam.

7. A camera having a photographic objective lens and a protection cover capable of shuttering off the front of at least said photographic objective lens, comprising:
(a) actuating means;
(b) electric motor means arranged so that current supply thereto is initiated by operation of said actuating means in an opening direction;
(c) driving means for opening and closing said protection cover, said driving means being arranged to receive the driving torque of said electric motor means for moving said protection cover to an opening position; and
(d) latching means arranged to effect a latching connection to latch said driving means when said protection cover is opened, said latching means being responsive to operation of said actuating means in a closing direction for releasing said latching connection.

8. A camera according to claim 7, further comprising:
(e) bias means urging said driving means in a direction for closing said protection cover.

9. A camera according to claim 8, further comprising:
(f) timer means controlling the period of current supply to said electric motor means, said timer means stopping current supply to said electric motor means after latching of said driving means by said latching means is completed.

10. A camera according to claim 9, wherein said timer means has a cam connected to be driven by said electric motor means, and an actuating lever contacting with said cam.

11. A camera according to claim 10, wherein said actuating lever is arranged upon engagement in a recess of said cam to cut off current supply to said electric motor means and upon riding on the outer periphery of said cam to allow current supply to said electric motor.

12. A camera according to claim 11, wherein said actuating means is arranged upon movement in an opening direction to disengage said actuating lever from said cam.

13. A camera according to claim 12, wherein said actuating means is held in either of the opening and closing positions.

14. A camera having a photographic objective lens and a protection cover capable of shuttering off the front of at least said photographic objective lens; comprising:
(a) actuating means;
(b) electric motor means arranged so that current supply thereto is initiated by operation of said actuating means in an opening direction;
(c) charging means for charging an exposure mechanism of said camera, said charging means being moved as the driving torque of said electric motor means is transmitted thereto;
(d) driving means controlling the opening and closing operation of said protection cover in response to said charging means; and
(e) first latching means arranged to effect a latching connection to latch said driving means when said protection cover is opened, said first latching means being responsive to movement of said actuating means in a closing direction releasing said latching connection.

15. A camera according to claim 14, further comprising:
(f) bias means urging said driving means in a closing direction of said protection cover.

16. A camera according to claim 15, wherein said charging means is responsive to charging actuation to move said photographic objective lens forwards to a prescribed position.

17. A camera according to claim 16, further comprising:
(g) second latching means for latching said charging means in a charge-completed position; and
(h) bias means urging said charging means in a direction to move said photographic objective lens rearwards.

18. A camera according to claim 17, wherein said second latching means responsive to movement of said actuating means in a closing direction releases connection with said charging means.

19. A camera according to claim 18, wherein said charging means has a plurality of teeth engageable with said second latching means in an in-focus position of said photographic objective lens.

* * * * *